Figure 1:
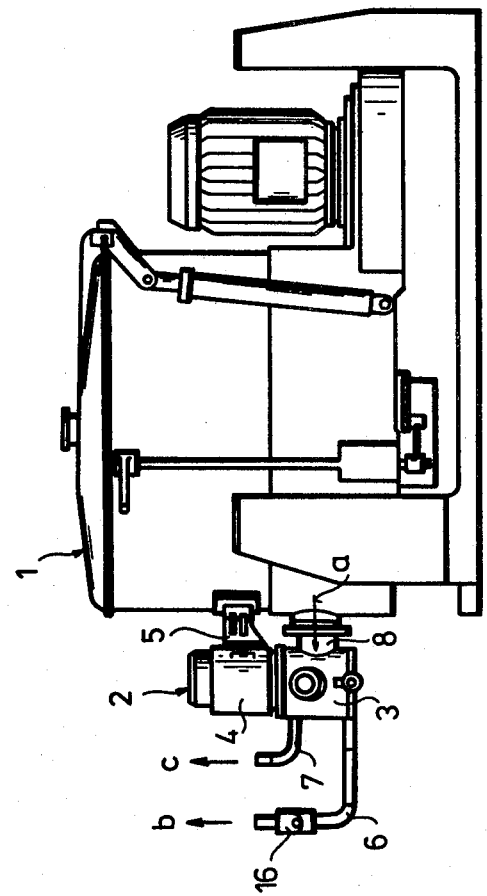

United States Patent [19]

Banos et al.

[11] Patent Number: 4,461,632
[45] Date of Patent: Jul. 24, 1984

[54] APPARATUS FOR TRANSFER OF LIQUID AND FOR REMOVAL OF GASES SEPARATING FROM LIQUIDS

[75] Inventors: Zoltán Banos; István Takacs; Endre Vereczkey; Dezsö Vigh, all of Budapest, Hungary

[73] Assignee: Richter Gedeon Vegyeszeti Gyar R.T., Budapest, Hungary

[21] Appl. No.: 445,834

[22] Filed: Nov. 30, 1982

[30] Foreign Application Priority Data

Dec. 1, 1981 [HU] Hungary ............................. 3612/81

[51] Int. Cl.³ .............................................. B01D 19/00
[52] U.S. Cl. ........................................ 55/190; 55/201; 415/168
[58] Field of Search .................. 55/182, 190, 199–201; 415/121 R, 168

[56] References Cited

U.S. PATENT DOCUMENTS

| | | | |
|---|---|---|---|
| 1,013,329 | 1/1912 | Strohbach | 55/200 |
| 1,908,635 | 5/1933 | LaBour | 415/121 R |
| 2,216,542 | 10/1940 | Paige | 55/199 X |
| 2,434,596 | 1/1948 | Spieth | 55/200 X |
| 3,269,325 | 8/1966 | Schwed et al. | 415/121 R X |
| 3,686,831 | 8/1972 | Libby | 55/199 |

FOREIGN PATENT DOCUMENTS 745930 7/1970 Belgium ............................. 55/201

Primary Examiner—Robert H. Spitzer
Attorney, Agent, or Firm—Young & Thompson

[57] ABSTRACT

Apparatus for the transfer of liquids and the removal of gases from liquids, comprises a chamber divided into upper and lower parts by a horizontal separating wall. The separating wall has a central opening through which extends the shaft of an impeller which is disposed in the lower part of the chamber. The shaft is driven by a motor mounted atop the chamber. The upper part of the chamber has a volume greater than that of the lower part by at least one order of magnitude. Liquid from which gas is to be removed is fed into the upper part and flows through the transfer port, past the rotating impeller, and is removed in degasified form from the lower part. The removed gas escapes from the upper part. The margins of the separating wall are specially tapered and the impeller blades have a matching taper. A liquid seal can be provided upstream of the inlet for gassy liquid into the chamber. An illuminator and viewer for the upper chamber can be provided to monitor the operation. A valved hole can be provided through a marginal portion of the separating wall for recirculation of the liquid.

30 Claims, 11 Drawing Figures

APPARATUS FOR TRANSFER OF LIQUID AND FOR REMOVAL OF GASES SEPARATING FROM LIQUIDS

The invention relates to an apparatus for transfer of liquid and for removal of gases separating from liquid, which has a chamber with an impeller and the wall of the chamber has liquid inlet and outlet ports.

In several industrial fields, especially in the chemical and food industries separation of the suspension consisting of solid and liquid phases is carried out mostly with filter centrifuge, the drum-jacket of which is perforated and the solid phase (sludge) separating from the suspension upon the impact of the centrifugal force is deposited on the jacket, or on the surface of the filter cloth on the jacket and forms a filter layer thereon. The liquid phase, i.e. the filtrate flowing through the layer of sludge and through the filter cloth passes into the collector, from which it can be removed. The filtrate carries along gas, e.g. air by the ventilating action of the rotary filter drum, which is sucked up by the centrifuge through the leaky parts of the cover and discharged as a mixture of the gas and liquid through the outlet ports of the liquid, consequently the liquid and gas have to be removed from the collector. The proportion of the removed liquid and gas varies significantly during the filtering process: at the beginning of the filtering a large volume of liquid passes through and the amount of gas is relatively small, while later the quantity of liquid diminishes and finally stops, and by the end of the filtering process the proportion of the gas suddenly increases by leaps. For safety-technical reasons the liquid-gas suspension is removed through the outlet of the collector in such a way, that the filtrate should not rise within the jacket of the filter centrifuge above the lower plane of the drum; namely the sudden overload of the rotary part and breakage of the machine, or accident can be avoided only this way.

Frequently in chemical industries a solid substance must be filtered from an organic solvent by centrifugal force. In this case for safety-technical reasons the oxygen concentration has to be below the explosion limit in the drum of the centrifuge at the rotary parts, which can be realized with the admission of rare gas. The filtrate (solvent) is removed in such a way as to prevent the entry of oxygen (air) into the interior of the centrifuge, on the other hand loss of the rare gas should be minimal.

It is a frequent requirement, that upon completion of the filtering process, the impurities adhering to the surface of the solid granular substance retained in the drum are washed down during rotation of the drum by admission of liquid, e.g. solvent. For safety-technical and economic reasons it is important to admit only as much washing liquid into the centrifuge as necessary for removal of the impurities. In several industrial processes it is necessary to prevent drop of the temperature during pumping, or its increase should be possible.

For receiving and transfer of the filtrate leaving the centrifuge, the following solutions are most frequently used in practice:

if the filtrate is not utilizable, or it can be discharged directly into the sewage system without any pretreatment, then the outlet of the centrifuge—usually with the insertion of a liquid seal—is simply sewered by way of a flexible pipe connection. In order to discharge the liquid without trouble, a gas separating vessel is built in between the centrifuge and the sewer. The separated gas passes out through the pipe on the top of the vessel, while the liquid passes into the sewer through the liquid seal.

if the filtrate is valuable, e.g. it contains active agent or solvent, and thus it will be further processed, or if it is polluted with such materials which can not be sewered, the filtrate—if a utilizable level difference exists—is passed by gravitation directly into the collecting tank mounted under the centrifuge, from which it is transferred by pump, and the separated gas passes into the open through the the vent hole. In order to ensure the trouble-free flow of the liquid, frequently a small gas separating vessel is used at the centrifuge, from the top of which the gas passes into the open, while the filtrate at the bottom passes into the collecting tank. If no significant level difference exists between the centrifuge and filtrate collecting tank for reasons of building or structural conditions, then the centrifuge is placed on an elevated pedestal and a smaller intermediate collecting tank is used. The liquid and gas pass into this tank, the gas passes out through the upper outlet, while the liquid is transferred with the pump.

The gas-proof centrifuges are provided with a liquid seal, and the liquid flows to the pump through the liquid seal.

In several fields of chemical industry (e.g. extraction of liquid from liquid) liquids of different specific weight have to be separated by gravitation during the given process. In the course of the process for instance the liquid of greater specific weight has to be removed at a continuous rate in such a way, that the amount of liquid carried along by the other liquid and having a different physical property (e.g. lower specific weight) should be minimal. For such tasks a large size glass cylinder, or glass tank is connected to the lower outlet of the settling tank (e.g. a liquid-liquid extractor of intermittent operation) and the liquid delivery pump—provided with a shut-off device—is connected to the lower outlet of the glass cylinder or glass tank. Control of the liquid flow, i.e. the sharp separation of the liquids having different properties, is carried out with the aid of a shut-off device, e.g. ball pivot.

The disadvantage of above solution is, that several apparatuses and accessories (tanks, pumps, shut-off devices, liquid seals, glass cylinders, etc.) are necessary for transfer of the liquids containing gas and/or having different physical properties. A further drawback is that in the case of closed centrifuges the washing is solved only in a complicated way, since the washing process is not controllable.

The purpose of the invention is to provide such apparatus for transfer of liquids, which allows the continuous removal of the gases separated from the liquid simultaneously with the delivery without additional apparatuses, accessories and similar devices, and thus it allows the transfer of liquids containing gas and/or phases of different physical properties with favourable operating characteristics and small space demand.

A further purpose of the invention is to provide apparatus adapted to variation of the quantity and quality of the liquid with time.

The invention is based on the following recognitions:

If the liquid to be transferred is fed into a space wherein an impeller with a vertical driving axle is arranged in the lower space-part separated from the upper space-part by a wall provided with a central hole, and the cubic capacity of the upper space-part exceeds significantly that of the lower space-part, then the gas-liquid suspension can freely flow to the impeller, and the gas can be separated from the suspension, whereby transfer of the gaseous liquid can be realized by elimination of the above mentioned difficulties of the presently known solutions. Furthermore the invention is based on the recognition that the shape of the upper space-part with suitable dimensions allows the visual observation of the delivery and liquid admission processes.

On the basis of these recognitions the problem is solved with the aid of such apparatus, which has a chamber with an impeller, and a wall delimiting the chamber has liquid inlet and outlet ports. According to the invention the chamber is divided into upper and lower space-parts by the separating wall provided with a transfer port. The volume of the upper space-part exceeds that of the lower space-part. The impeller is arranged in the lower space-part. The inlet port of the liquid leads to the upper space-part, while the outlet port leads out of the lower space-part. A gas discharge hole is in the chamber wall delimiting the upper space-part. The volume of the upper space-part of the chamber exceeds that of the lower space-part at least by one order of magnitude, and the chamber is a body of rotation. An outlet pipe is connected—preferably tangentially—to the outlet port of the liquid. The outlet port of the gas is formed in the upper portion of the upper space-part of the chamber, and a gas outlet pipe is connected to the outlet port. A check valve—e.g. a ball check valve—is built into the outlet pipe of the liquid.

According to a further feature of the invention the inlet pipe connected to the inlet port of the liquid runs directly above the separating wall or in its vicinity to the upper space-part of the chamber. Furthermore it is expedient if the cross section of the liquid inlet port is at least double that of the outlet port, and of the transfer port in the separating wall if the chamber is centrally arranged, as well as if the cross section of the transfer port is smaller than that of the liquid inlet port, but greater thn the cross section of the liquid outlet port. Preferably the cross section of the chamber is expanding downwards, and it has preferably a truncated cone-shaped interior.

According to a further invention feature, the separating wall in the chamber contracts towards the circumferential region delimiting the transfer port, and the angle of inclination of the upper face of the separating wall is smaller than that of the lower face; the oblique section of the lower face—in the radial direction—is shorter than the oblique face of the upper face. According to another embodiment given by way of example, the upper surface of the impeller blades—at least in part—is parallel with the lower surface—or at least in part—of the separating wall. Furthermore it is expedient if the blades of the impeller become progressively thinner towards the circumferential region, and the lower space-part of the chamber—preferably by shaping the lower surface of the separating wall at an angle upwards and outwards—is expanded outwards in the range of the blades' outer end.

According to a further invention feature, the driving axle of the impeller is connected to the impeller by its lower part passing through the upper space-part of the chamber and through the transfer port, while its upper part is interconnected with a drive—e.g. an electric motor—arranged above the chamber.

A preferred embodiment of the invention is provided with an illuminator for illumination of the upper space-part of the chamber, as well as with a viewer allowing the observation of the same upper space-apart. The illuminator and viewer consist of a transparent—in a given case translucent—sheet, preferably a sheet of glass sealed into the wall of the tubular bodies expanding inside, and the illuminator and viewer are arranged opposite each other, or their longitudinal axes are at a right angle or obtuse angle to each other.

Another preferred embodiment of the apparatus according to the invention has a liquid seal outside the chamber in front of the liquid inlet port, e.g. a closed seal allowing its connection possibility with the gas-proof centrifuge. For realization of the liquid seal the apparatus is provided suitably with a counter tank fitted with a pipe leading to the upper space-part of the chamber; a pipe for admission of the liquid coming from the centrifuge and leading to the upper region of the counter tank, as well as a wall separating the inlet and outlet ports of the pipes from each other, said separating wall is connected to the cover of the counter tank and to its wall on both sides, while it ends have suitable spacing at the bottom, or it has a transfer port in the vicinity of the bottom. The counter tank may be cylindrical and the separating wall vertical or nearly vertical. The cross sections of the inlet and outlet pipes of the counter tank are identical, or nearly identical and the longitudinal axis of the latter runs below the longitudinal axis of the former with suitable spacing, where the spacing is equivalent to the radius of the pipes. A gas outlet pipe leads out from the upper region, preferably from the cover of the counter tank.

A further embodiment of the apparatus is characterized in that the chamber is connected with the drive—e.g. an electric motor—via an elongated bracing-spacing pipe, in the interior of which is the driving shaft and the interior of the pipe is interconnected with the upper space-part of the chamber, to which a pipe is connected leading to the gas-space of the reactor connected with the apparatus, or used for supplying the liquid into the apparatus.

According to another invention feature, the bearing of the impeller shaft extends into the vessel containing the cooling medium retained from the pumped medium.

In a further embodiment of the apparatus given by way of example, a shut-off—openable hole is in the separating wall, suitably in its circumferential region for recirculation of the liquid within the chamber, between the lower and upper space-parts. This transfer port is truncated cone-shaped expanding upwards, into which a conical valve body provided with an actuating rod is fitted.

Finally it is a suitable embodiment of the apparatus, wherein the chamber has a double wall and pipes for the inlet and outlet of the heating or cooling medium lead into the space between the walls.

The invention is described in detail with the aid of drawings showing some of the preferred embodiments of the apparatus given by way of example, as follows:

FIG. 1: Diagrammatic side view of the apparatus connected with a conventional centrifuge.

Figure 2:
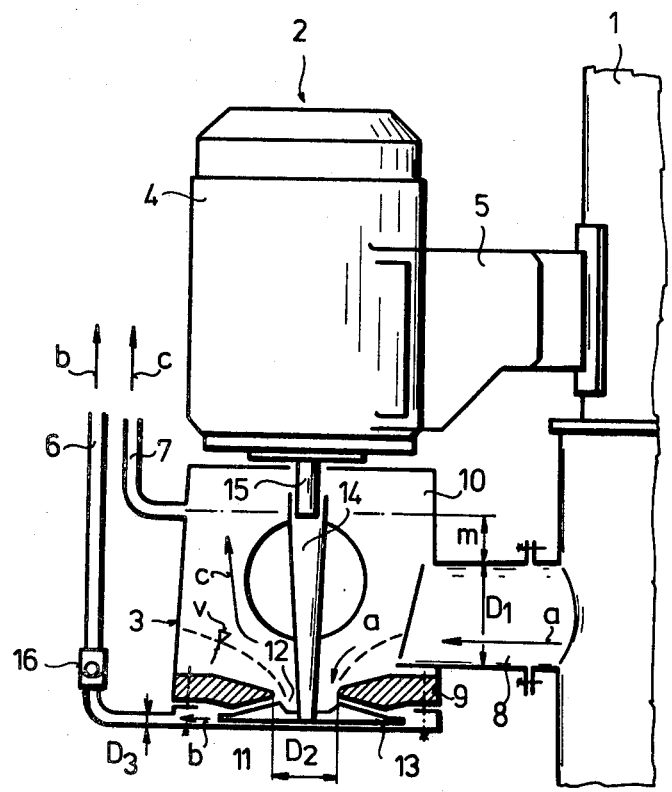

FIG. 2: Vertical section of the apparatus according to FIG. 1, drawn to a larger scale taken along line C—C in FIG. 3.

Figure 3:
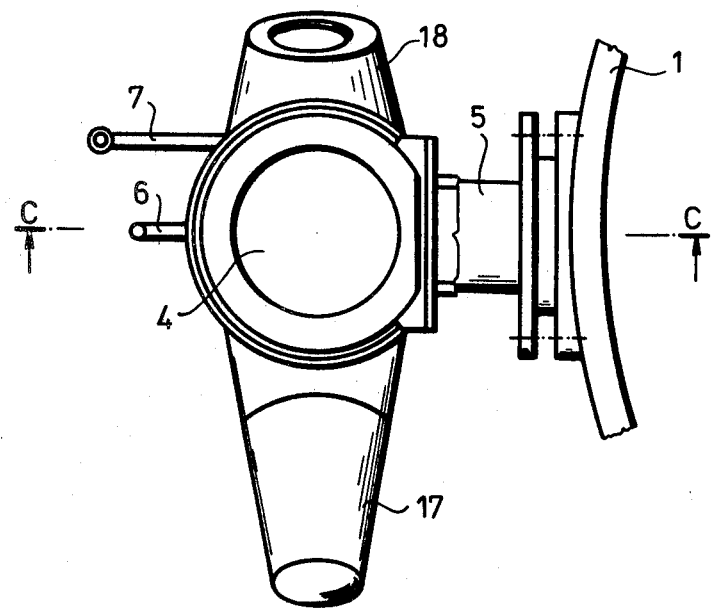

FIG. 3: Top view of the apparatus shown in FIG. 2.

Figure 4:
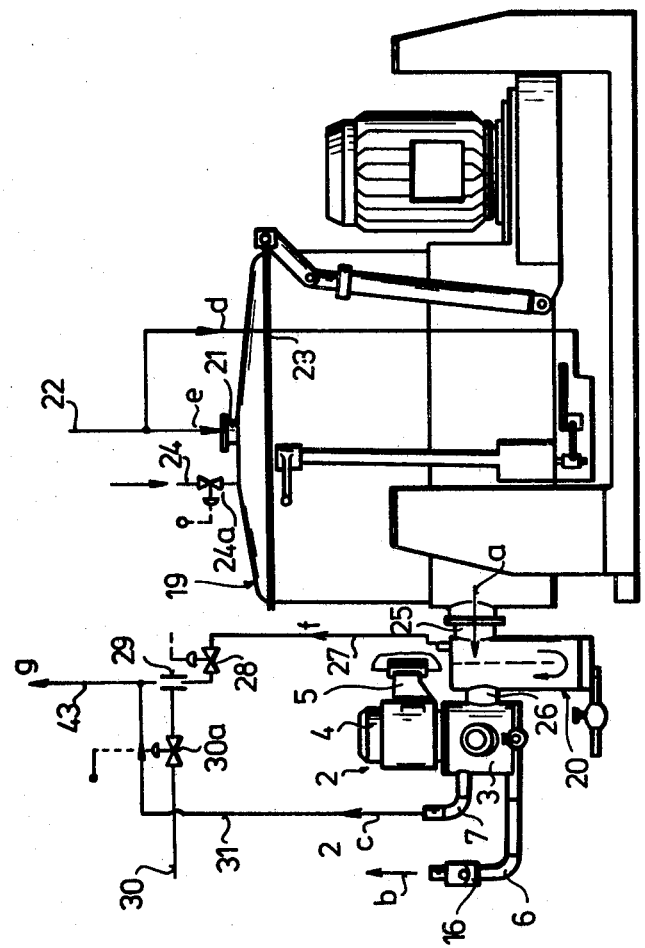

FIG. 4: Diagrammatic side view of the apparatus given by way of example connected to a gas-proof centrifuge with a liquid seal.

Figure 5:
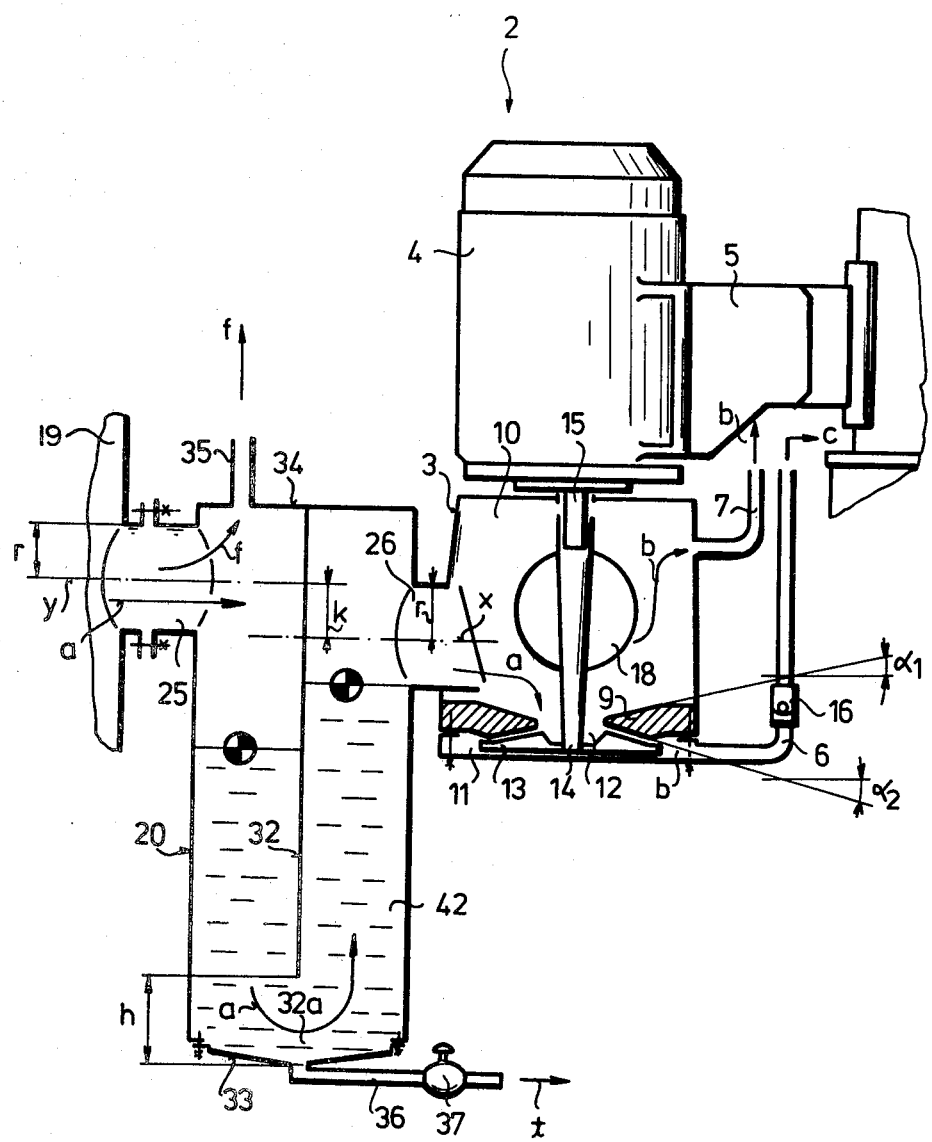

FIG. 5: Vertical section of the apparatus shown in FIG. 4, drawn to a larger scale, taken along line A—A in FIG. 6.

Figure 6:
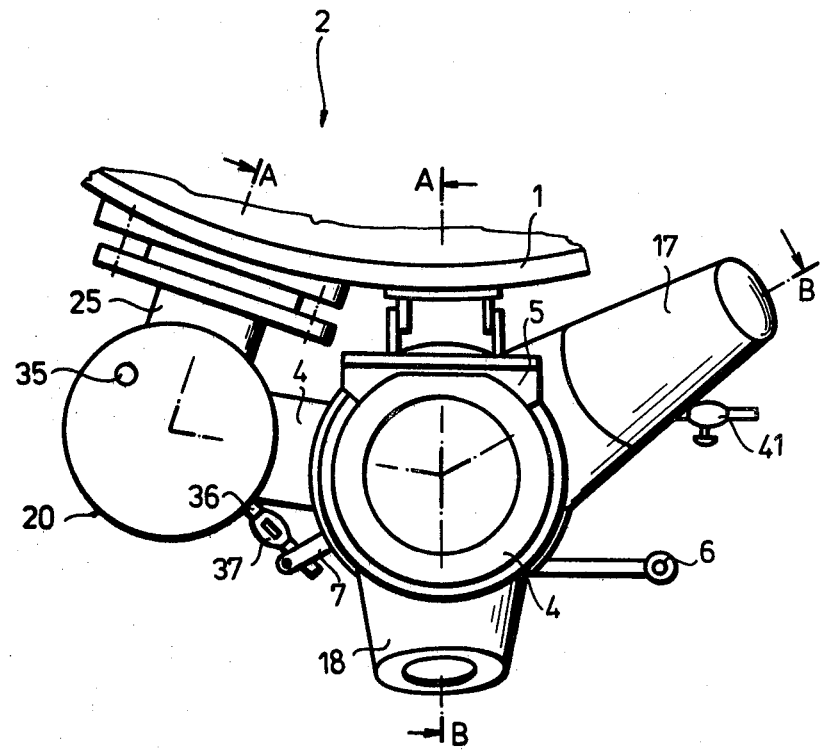

FIG. 6: Top view of the apparatus shown in FIG. 5.

Figure 7:
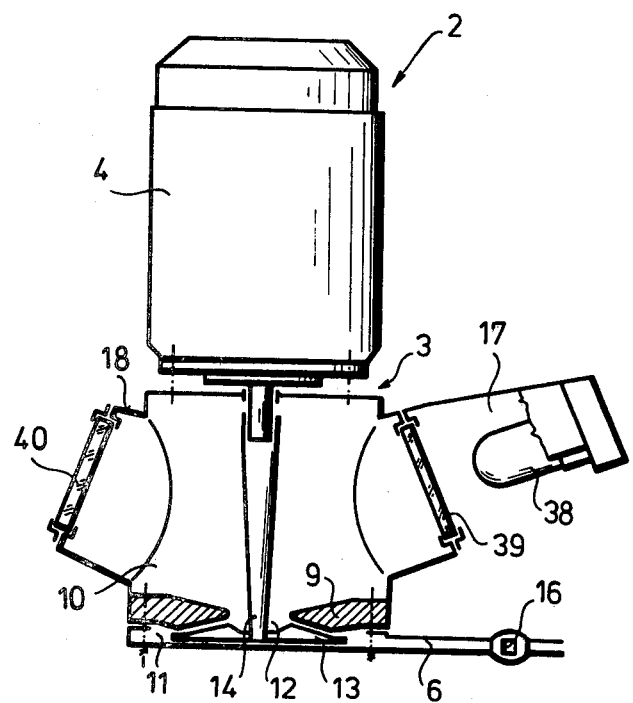

FIG. 7: Section along line B—B in FIG. 6.

Figure 8:
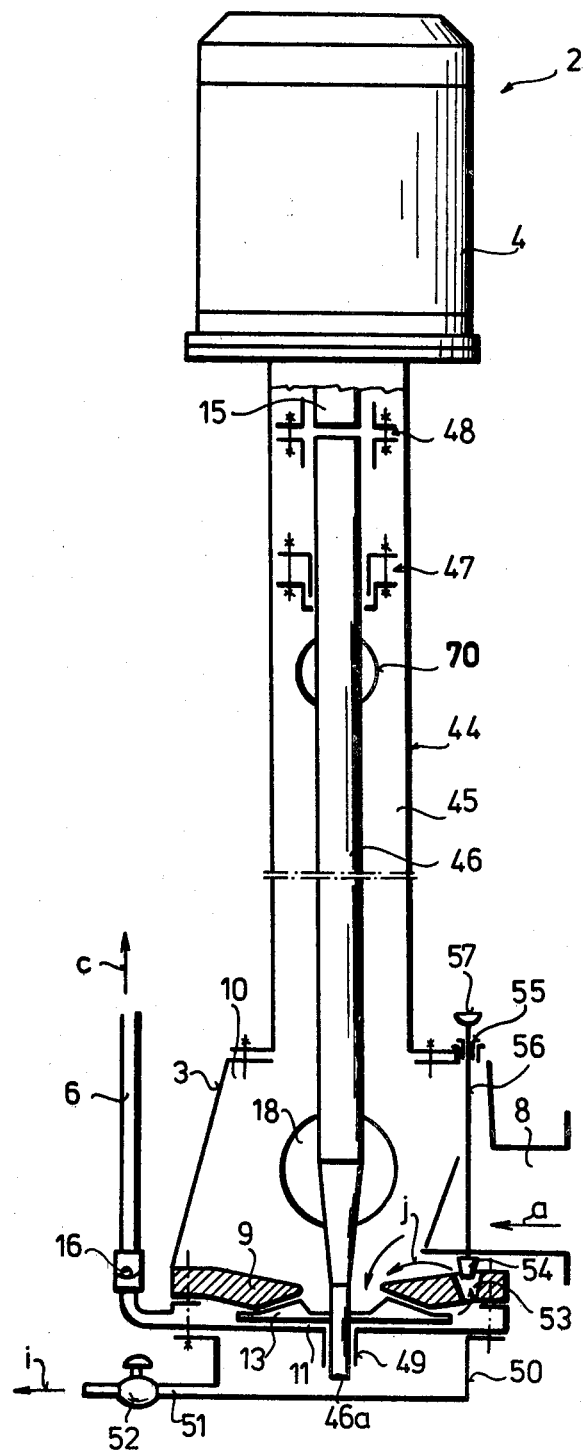
Figure 9:
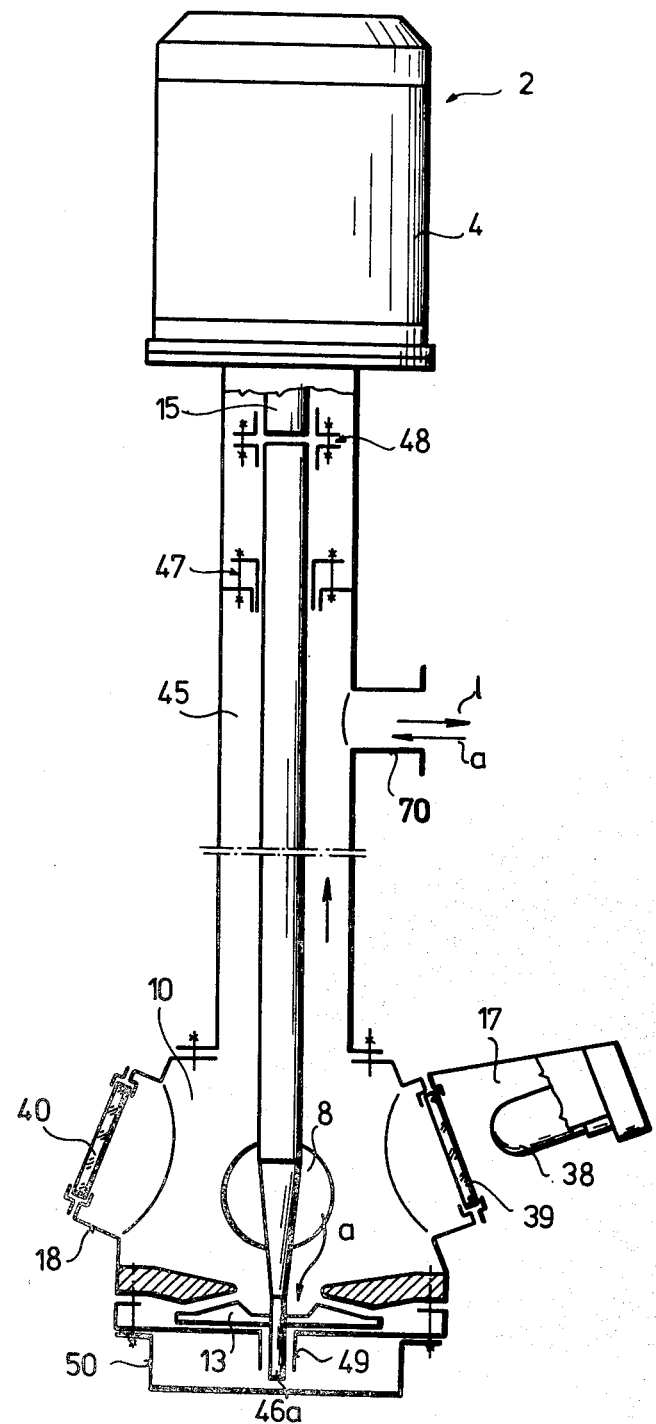

FIGS. 8 and 9: Embodiment of the apparatus given by way of example connected to a reactor with an extended shaft shown in two vertical sections perpendicular to each other.

Figure 10:
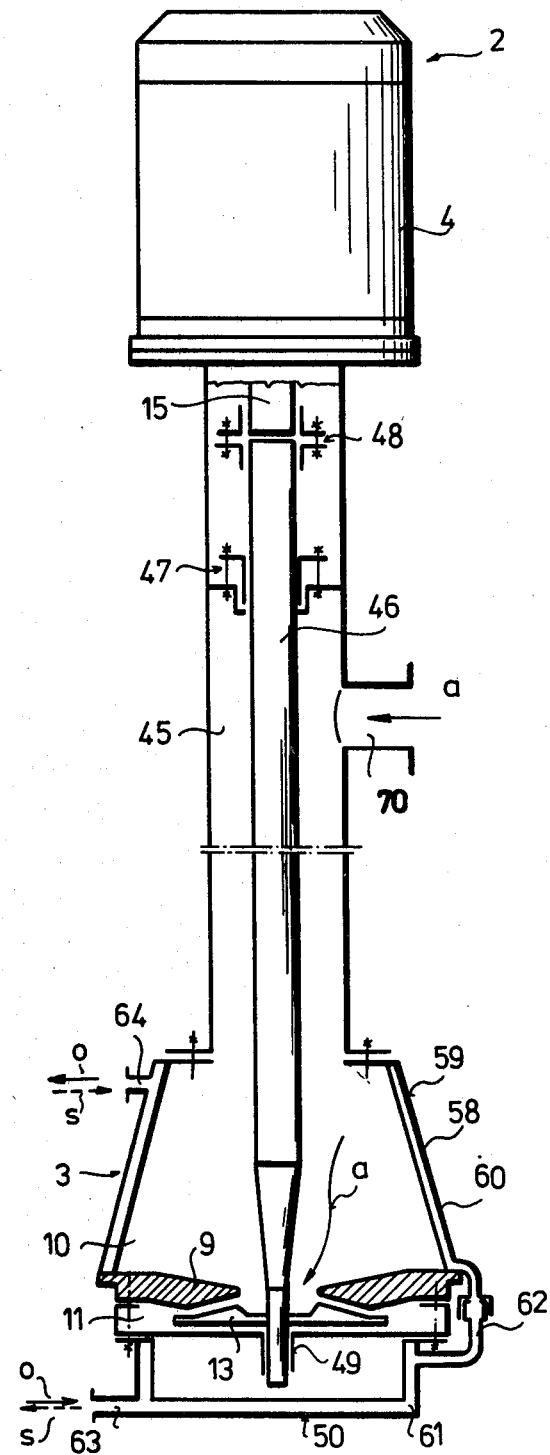

FIG. 10: Vertical section of the double walled apparatuses similar to those shown in FIGS. 8 and 9.

Figure 11:
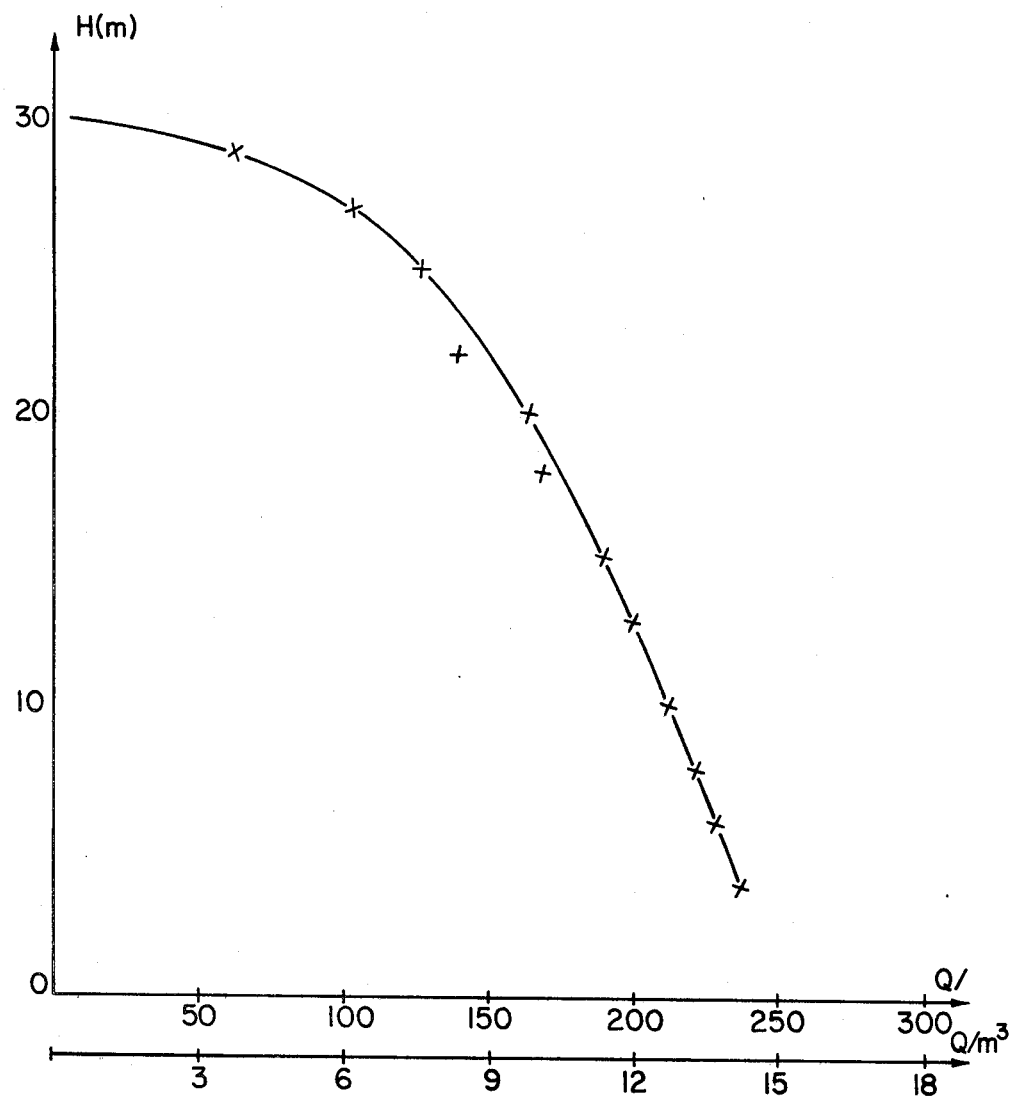

FIG. 11: Characteristic curve of the pump for the apparatus according to the invention.

FIG. 1 shows the conventional, so-called open centrifuge marked with reference number 1 in its totality and the connected apparatus according to the invention marked with 2. The apparatus 2 has a chamber 3 for transfer of liquid, and an electric motor 4 fixed to the outer cylindrical wall of the centrifuge 1 by arms 5. An outlet pipe 6 of the liquid extends from the lower part of the chamber 3 and a gas outlet pipe 7 from the upper part. The centrifuge 1 is connected with the chamber 3 through a pipe 8. The gassy liquid enters the chamber 3 from the centrifuge 1 in the direction of arrow a, while the degasified liquid passes out of the chamber 3 in the direction of arrow b, and the separated gas in the direction of arrow c.

The apparatus 2 can be studied in detail drawn to a larger scale as shown in FIGS. 2 and 3. The structural parts and flow directions of the medium dealt with in FIG. 1 are marked with the quoted reference numbers and letters. The interior of the truncated cone-shaped liquid transfer chamber 3 slightly contracting upwards is divided by a separating wall 9 into upper space-part 10 and lower space-part 11. A central hole 12 is formed in the horizontal or nearly horizontal separating wall 9; a vertical axle 14 of an impeller 13 having blades passes through said hole 12, the upper end of the axle 14 is interconnected with a driving shaftstub 15 of the electrical motor 4 FIG. 2 clearly shows that the lower space-part 11 of the chamber 3 is filled nearly completely by the impeller 13, and the cubic capacity of the upper space-part 10 exceeds that of the lower space-part 11 by one, or several orders of magnitude. A ball check valve 16 is built into the liquid outlet pipe 6.

As shown in FIG. 2, diameter $D_2$ of the central hole 12 in the separating wall 9 is smaller than diameter $D_1$ of the pipe 8 connecting the centrifuge 1 with the chamber 3, while $D_2$ exceeds the diameter $D_3$ of the liquid outlet pipe 6, i.e. the ratio $D_3<D_2<D_1$ exists. The pipe 8 extends directly or nearly directly into the chamber 3 above the separating wall 9, i.e. into the upper space-part 10 from which the gas outlet pipe 7 emerges, while the pipe 6 emerges from the lower space-part 11. An illuminator 17 and a viewer 18 shown in FIG. 3, are connected to the upper space-part 10 of chamber 3 (these will be dealt with in detail in connection with FIGS. 5-7).

The operation of the apparatus according to FIGS. 1-3 is as follows:

The cover of centrifuge 1 is closed and the centrifuging process is carried out. The gassy liquid passes from the centrifuge 1 through the pipe 8 along the path marked a in free flow into the upper space-part 10 of the apparatus 2. The path of the water in the interior of the apparatus 2 and the outlet pipe 6 is marked with arrow a, the water surface is marked with a dashed line and reference letter v in the upper space-part 10 as shown in FIG. 2, the impeller 13 driven by the electric motor 4 removes the liquid from the lower space-part 11 of the apparatus 2 through the pipe 6 in the direction of arrow b. The gas separated from the liquid in the upper space-part 10 passes out of the apparatus through pipe 7 along the path marked with arrow c.

The characteristic curve of the apparatus (pump) according to FIGS. 1-3 is shown in FIG. 11; the weight of the apparatus 2 including the electric motor 4 is 72 kg (without the electric motor 34 kg). The power of the electric motor 4 is 2.2 kW, and its speed is 2855 rpm.

An embodiment of the apparatus according to FIGS. 4-7, differs from that shown in FIGS. 1-3 in that it has a counter tank allowing the connection to the closed, gas-proof centrifuge; the centrifuge in FIG. 4 is marked with reference number 19, and the counter tank with 20, and for marking of the already described structural elements the respective reference numbers are applicable. An inlet duct 22 for the admission of nitrogen extends to a pipe stub 21 on cover of the centrifuge 19, from which a duct 23 is branched off and connected to the lower part of the centrifuge 19. An air inlet duct 24 extends into the centrifuge similarly at the top, in which a shut-off device 24a is disposed.

The counter tank 20 is disposed between the centrifuge 19 and the apparatus 2. The centrifuge 19 and the counter tank 20 are interconnected by a pipe 25, while the counter tank 20 and the apparatus 2 are interconnected by a pipe 26. As shown in FIG. 4, an air outlet pipe 27 emerges from the upper part of the counter tank 20, in which first a shut-off device 28, then an injector 29 are disposed, to which a duct 30 is connected for compressed air supply. A duct 31 from the gas outlet pipe 7 is connected after the injector 29 to a duct 43. The duct 30 is also provided with a shut-off device 30a.

This embodiment of the apparatus provided with counter tank 20 shown in FIGS. 5-7 to a larger scale; the chamber 3 and the electric motor 4 are essentially the same as those already described according to FIGS. 2 and 3, consequently the identical structural elements are marked with the same reference numbers. Vertical separating wall 32 in cylindrical counter tank 20 depends from a cover 34 of the tank and ends at height h from bottom 33 of the counter tank 20. The pipe 25 interconnecting the counter tank 20 and centrifuge 19 opens into the counter tank under the cover 34 on one side of the separating wall 32, while the pipe 26 on the other side of the separating wall 32 leaves the upper region of the counter tank 20 but its longitudinal axis x is lower by a distance k than axis y of the pipe 25 (FIG. 5). Distance k is identical to or nearly identical radius r of the pipes. A pipe stub 35 emerges from the cover 34 of the counter tank 20, to which said outlet pipe 27 is connected (FIG. 4). The bottom plate of the counter tank 20 is slightly inclined downwards, and a discharge duct 36 emerges from its deepest point in which a shut-off device 37 is provided; the liquid is discharged from said tank 20 through the said duct in the direction of arrow t.

It is to be noted, that in the interest of clarity the apparatus 2 is shown in FIG. 5 differently from in FIG. 4, but the apparatus and its operation are naturally the same.

The illuminator 17 and viewer 18 are clearly shown in FIGS. 6 and 7, the illuminator 17 consists of a bulb 38 and a sheet of glass 39 sealed into the wall, while a sight glass 40 is built into the viewer 18 and similarly sealed into the wall.

FIG. 5 illustrates some essential characteristics of the geometrical shape of the separating wall 9 and the impeller 13. The separating wall 9 is formed as contracting towards the central hole 12, in such a way that the obliquity of the upper surface—angle $a_1$ is less than the obliquity of the lower surface—angle $a_2$, i.e. $a_1 < a_2$. The inclination of the upper part of the impeller 13 blades is $a_2$, and it is parallel with the generatrices of the surface-region—adjacent to the hole 12—of the lower face of the separating wall 9.

The operation of the apparatus according to FIGS. 4–7, is as follows:

When the cover 34 is closed, the centrifuge 19 (centrifuge space and bearing) is flushed out with nitrogen in such a way, that nitrogen gas is fed into the apparatus through the ducts 22, 23 in the direction of arrows a, e, until the quantity of oxygen in the gas flow leaving the counter tank 20 through the duct 27 in the direction of arrow f drops below a specific value (FIGS. 4 and 5). The nitrogen or nitrogen-rich air in the counter tank 20 flows above a liquid seal 42 (FIG. 5) and passes into the open through venting duct 43 (FIG. 4) in the direction of arrow g. After flushing, the actual centrifuging process may begin, during which the amount of nitrogen lost because of the leakages has to be replaced.

The upper space-part 10 of the chamber 3 is also connected into the air duct 43 through the ducts 7, 31 (FIG. 4), thus no overpressure or depression will occur in the interior of the chamber 3. Upon completion of the centrifuging process—since the operator has to bend over the centrifuge 19 in order to discharge it—the nitrogen has to be removed from the centrifuge 19. For this purpose compressed air is admitted into the injector 29 through the duct 30 (FIG. 4) thus a depression suitably about 150–200 mm of water is brought about in the centrifuge 19. This way the interior of the centrifuge 19 is flushed out with air, and nitrogen gas is displaced. The through-flow takes place above the liquid seal 42 (FIG. 5), until the amount of nitrogen in the interior of the centrifuge is reduced to such an extent that the operator can bend over the centrifuge 19 without the risk of danger. The paths of the liquid and gas flow are marked with the earlier used arrows a, b, c.

FIGS. 8 and 9 show another embodiment of the apparatus according to the invention with an extended shaft connected to a reactor. The identical structural elements are marked with the reference numbers used earlier. Here the electric motor 4 is connected with the chamber 3 through bracing-spacing pipe 44 in such a way, that a closed space 45 of the pipe 44 is interconnected with the upper space-part 10 of the chamber 3. The impeller 13 fitted with blades is fixed to a lower smaller diameter stub 46a of a driving shaft 46 running in the pipe 44. A stuffing box 47 on the upper part of the driving shaft 46 prevents escape of the gas or steam from the closed space 45 to the motor or into the open air during rotation of the driving shaft 46. The driving shaft 46 is connected to the shaft stub 15 of the electric motor 4 through a coupling gear 48. A pipe stub 70 emerges from the pipe 44 below a stuffing box 47, the purpose of which will be described at a later stage. The lower shaft stub 46a is received in a bearing 49 mounted on the base plate of the chamber 3. The bearing 49 extends into a closed vessel 50, the interior of which can be washed with the pumped liquid, the cooling liquid passes from the vessel 50 through a duct 51 comprising a shut-off device 52 in the direction of arrow i, (FIG. 8).

During certain technological processes, recirculation of a certain part of the liquid within the chamber 3 may become necessary. For this purpose a tapered hole 53 expanding upwards is formed in the separating wall 9, which can be shut and opened with the aid of a similarly tapered valve body 54. A rod 56 extending from the upper space-part 10 through a stuffing box 55 is used for actuation of the valve body 54, the upper end of which is fitted with a valve handle 57. By its turning the hole 53 can be progressively opened and shut. The apparatus 2 is connected to a reactor (not shown) by the pipe 8; in this case direction of the liquid inlet is marked with arrow a. A pipe (not shown) is connected to said pipe stub 70 which leads into the gas-space of the reactor, whereby the gas-space of the apparatus and reactor are interconnectible.

The direction of the gas flow is marked with arrow 1 in FIG. 9. The same diagram demonstrates that liquid too can be admitted into the apparatus through pipe stub 70 in the direction of arrow a. This will be necessary when the apparatus is used as a series connected reactor. In this case the apparatus comprising the hole 53 (FIG. 8) of adjustable cross section functions as a reactor and the reactive mixture passes to the pipe stub 70 of the next apparatus. The apparatus shown in FIGS. 8 and 9 is used to particular advantage when connection to the reactor is such that the apparatus is attached to the bottom of the reactor and when the stuffing box 47 and the electric motor 4 are above the liquid level. The operation of the pump according to FIGS. 8 and 9 is the same as described earlier in connection with FIGS. 1 and 7.

The embodiment of the apparatus shown in FIG. 10 differs from that shown in FIGS. 8 and 9, in that the chamber 3 is double walled, consequently it has side walls 58, 59 and heating or cooling medium can be circulated in a space 60 between the walls 58, 59. The wall of the vessel 50 receiving the bearing 49 is also double, here the space used for circulation of the heating or cooling medium is marked with reference number 61. Spaces 60 and 61 are interconnected with a pipe 62.

If liquid is used as the heating medium, it is admitted through pipe 63 into the space 61 (arrow o), from which the medium passes through the pipe 62 into the space 60 and leaves through a pipe 64—at lower temperature—(arrow o). If natural steam is used as the heating medium, it is admitted through the pipe 64 in the direction of arrow s, and—when cooled down—leaves through the pipe 63.

The apparatus shown in FIG. 10 can be used to advantage in all cases when there is danger of congelation and the congelation can be averted by heat. Of course the embodiments of the apparatus shown in FIGS. 1–7 can also be used.

The beneficial effects related to the invention can be summed up as follows:

The gas separation takes place in the space used for transfer of the liquid without the need of additional equipment. Since there is no stuffing box, and it is not submerged in the liquid, the liquid delivery without loss is ensured. For instance the case of removal of the liquid from the centrifuge, there is no drip (this compared with the traditional apparatuses reduces the loss of liquid at least by 10%). No environment pollutant e.g. solvent can pass out of the system. The closed liquid transfer system is maximally safe. E.g. compared with the known apparatuses used for transfer of mother lye, the costs of investment can be considerably reduced with the use of the invention: an extra pump and a tank duct system are not needed, the centrifuge does not have to be placed at a higher level, etc. The quantity of solvent used for washing during the centrifuging process is less than in the traditional solutions, because the washing process can be monitored with the aid of the viewer, and when adequate purity is observed then the feeding of the washing liquid can be stopped immediately.

The apparatus can be used to advantage for closed, gas-proof centrifuges as well. The filtrate can be safely removed from the centrifuge, rotation of the rotary part of the centrifuge in the liquid does not occur, since the delivery capacity of the pump is always higher than the quantity of liquid removed per unit time.

The apparatus can be used not only as a pump, but as a reactor as well, and it is applicable for the delivery of liquids congealing at lower temperature. With the aid of the invention the liquid delivery can be ensured without loss in the case of liquid-liquid reactors as well, since the phase-limit of the liquids can be readily observed with the aid of the illuminator and viewer. The space requirement of the apparatus is substantially less than that of the similar, presently known apparatuses. The apparatus can be double walled, heated, or cooled, consequently it is suitable for the delivery of substances sensitive to temperature variation, since the problem of holding constant temperature is resolvable.

Naturally the invention is not restricted to the described examples but can be realized in several other ways.

What we claim is:

1. Apparatus for the transfer of liquids and the removal of gases from liquids, comprising a chamber, an impeller disposed in the chamber, means to rotate the impeller in the chamber, a separating wall dividing the chamber into an upper part and a lower part, a transfer port through the separating wall, the impeller having a shaft passing through the transfer port, the cubic capacity of the upper part exceeding the cubic capacity of the lower part and the impeller being disposed in the lower part, a liquid inlet port opening into the upper part, a liquid outlet port for the lower part, and a gas discharge outlet for the upper part.

2. Apparatus as claimed in claim 1, in which the cubic capacity of the upper part exceeds that of the lower part by at least one order of magnitude.

3. Apparatus as claimed in claim 1, in which the chamber is a body of revolution.

4. Apparatus as claimed in claim 1, in which a liquid outlet conduit is connected to the liquid outlet port.

5. Apparatus as claimed in claim 4, and a check valve in said liquid outlet conduit.

6. Apparatus as claimed in claim 1, in which the gas outlet port is disposed in the upper region of said upper part of the chamber, and a gas outlet conduit connected to said gas outlet port.

7. Apparatus as claimed in claim 1, and a liquid inlet conduit connected to said liquid inlet port immediately above said separating wall.

8. Apparatus as claimed in claim 1, in which the cross section of the liquid inlet port is at least twice that of the liquid outlet port.

9. Apparatus as claimed in claim 1, in which said transfer port is disposed centrally of said separating wall.

10. Apparatus as claimed in claim 1, in which the cross section of the transfer port is smaller than the cross section of the liquid inlet port but greater than the cross section of the liquid outlet port.

11. Apparatus as claimed in claim 1, in which the cross section of the chamber increases downwardly.

12. Apparatus as claimed in claim 1, in which the separating wall becomes progressively thinner toward said transfer port.

13. Apparatus as claimed in claim 12, in which the angle of inclination of the upper face of the separating wall is less than the angle of inclination of the lower face of the separating wall.

14. Apparatus as claimed in claim 13, in which the upper face of the separating wall has an upper face that inclines downwardly toward said transfer port and a lower face that inclines upwardly toward said transfer port, said lower face being shorter in a radial direction than said upper face.

15. Apparatus as claimed in claim 14, in which the impeller has blades whose upper surface is parallel to said lower face of the separating wall.

16. Apparatus as claimed in claim 15, in which said blades taper from greatest height centrally of the impeller to least height at the periphery of the impeller.

17. Apparatus as claimed in claim 1, in which said means for driving the impeller is disposed above the chamber.

18. Apparatus as claimed in claim 1, and means to illuminate the interior of said upper part of the chamber, and a viewer for observing said illuminated upper part.

19. Apparatus as claimed in claim 18, in which said illuminator and viewer include translucent sheets sealed into walls of the chamber.

20. Apparatus as claimed in claim 18, in which the illuminator and the viewer are disposed on opposite sides of the chamber from each other.

21. Apparatus as claimed in claim 1, and a liquid seal outside the chamber upstream of said liquid inlet port.

22. Apparatus as claimed in claim 21, in which said liquid seal comprises a counter tank having a pipe leading into said upper part of the chamber and a pipe leading to an upper portion of the counter tank for admission of liquid from a centrifuge, a cover for the counter tank, and a wall connected to the cover and extending downwardly through the counter tank between said pipes and terminating a distance above the bottom of the counter tank.

23. Apparatus as claimed in claim 22, in which said counter tank is cylindrical and said wall is substantially vertical.

24. Apparatus as claimed in claim 22, in which the cross sections of said pipes are substantially identical but the axis of the outlet pipe is spaced below the axis of the inlet pipe a distance equal to substantially half the diameter of the pipes.

25. Apparatus as claimed in claim 22, and a gas outlet pipe extending from the top of the counter tank.

26. Apparatus as claimed in claim 1, in which said rotating means is connected to said chamber by an elongated spacing pipe, and a drive shaft disposed within said spacing pipe extending between said rotating means and said impeller for rotating said impeller, the interior of said spacing pipe communicating with the interior of said chamber, said inlet port for liquid extending through said spacing pipe.

27. Apparatus as claimed in claim 26, the lower end of said shaft being disposed in a bearing which extends into a vessel containing a cooling medium.

28. Apparatus as claimed in claim 1, there being a hole through said separating wall adjacent an outer edge of said wall for recirculation of liquid within the chamber between said upper and lower parts, and means selectively to open and close said hole.

29. Apparatus as claimed in claim 28, the hole being of upwardly expanding truncated conical shape, and a tapered valve body selectively positionable in said hole by means of an actuating rod.

30. Apparatus as claimed in claim 1, said chamber having double walls, and means to circulate a fluid heat transfer medium between said double walls.

* * * * *